(Model.)

J. F. APPLEBY.
GRAIN BINDER.

No. 275,114. Patented Apr. 3, 1883.

(Model.) 6 Sheets—Sheet 4.
J. F. APPLEBY.
GRAIN BINDER.

No. 275,114. Patented Apr. 3, 1883.

ATTEST:
J. A. Hurdle
Jacob Felbel

INVENTOR:
John F. Appleby.
by atty J. Wm. McIntire (Model.)

J. F. APPLEBY.
GRAIN BINDER.

No. 275,114.  Patented Apr. 3, 1883.

ATTEST:
J. A. Hurdle
Jacob Felbel

INVENTOR:
John F. Appleby.
by atty
J. Mc Intire

UNITED STATES PATENT OFFICE.

JOHN F. APPLEBY, OF MINNEAPOLIS, MINNESOTA, ASSIGNOR TO THE MINNEAPOLIS HARVESTER WORKS, OF SAME PLACE.

GRAIN-BINDER.

SPECIFICATION forming part of Letters Patent No. 275,114, dated April 3, 1883.

Application filed September 6, 1882. (Model.)

*To all whom it may concern:*

Be it known that I, JOHN F. APPLEBY, of Minneapolis, in the county of Hennepin and State of Minnesota, have invented certain new and useful Improvements in Grain-Binders; and I do hereby declare that the following is a full, clear, and exact description thereof, reference being had to the accompanying drawings, making part of this application.

My invention relates to that type of automatic grain-binders in which the grain discharged from the upper end of the elevator is packed into a gavel of the proper size and degree of compactness, and in which the binder devices proper are automatically set in motion whenever the gavel is in the proper condition to be bound up; and my invention consists in certain novel features of construction and modes of operation of parts more especially adapted to this type of grain-binder, as will be hereinafter more fully explained, and as will be particularly pointed out in the claims of this specification.

To enable those skilled in the art to understand and practice my invention, I will now proceed to more fully explain the several features thereof, referring by letters to the accompanying drawings, forming a part of this specification, and in which I have shown so much of a grain-binder as seems to be necessary for the purpose of illustrating the several features of my invention, the machine being of the form known as the "Appleby" binder.

In the several figures of the drawings the same part will be found designated by the same letter of reference.

Figure 3:
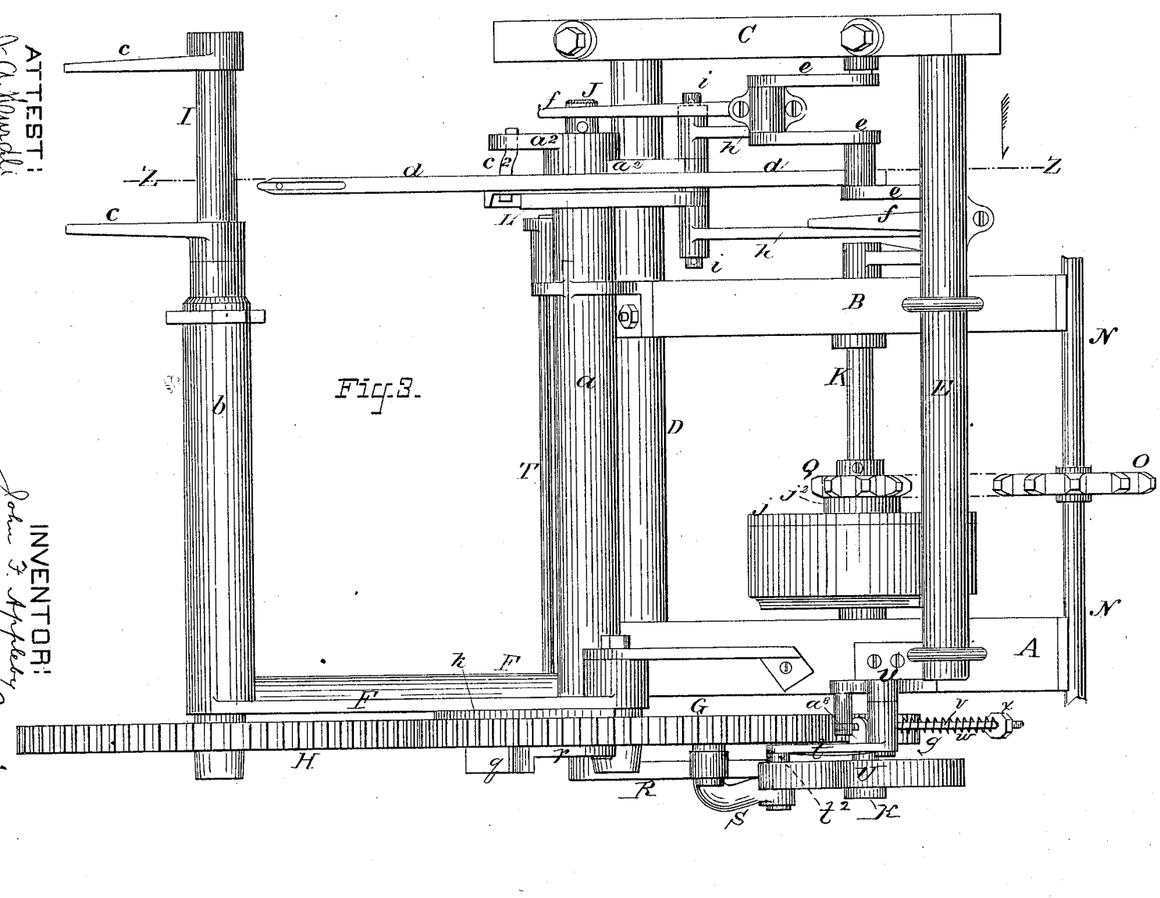
Fig. 3 is a top view.

A B C, Fig. 3, are the three upright, and D E the two horizontal pieces composing the main frame of the binder, which, as usual in the mounting of binders of the form shown, is attached to the harvester in an oblique position, and so that the binder will properly receive into its gavel-receptacle the grain discharged from the upper end of the elevator.

F is the main casting, having the two parallel pipes $a\ b$, the lower one, $a$, of which is securely bolted to the binder-frame and carrying the main gears G H and other parts, such as the cam-and-rack wheel, the knotter, cord-holder, &c., used in the Appleby kind of binder, and not shown in the drawings.

I is the usual shaft, on which are mounted (with other parts not shown) the sheaf-discharging arms $c\ c$; and J is the shaft on which is mounted the needle-arm $d$.

K is the shaft, which, by means of its cranks $e\ e$, drives the packers $f\ f$, and on which are mounted axially the pinion $g$, (which drives the binder devices proper,) and also a planetary system of gearing, (to be presently described,) the said binder devices proper deriving their motions from said pinion $g$ through the medium of gears G H.

Figures 4, 5, 6:
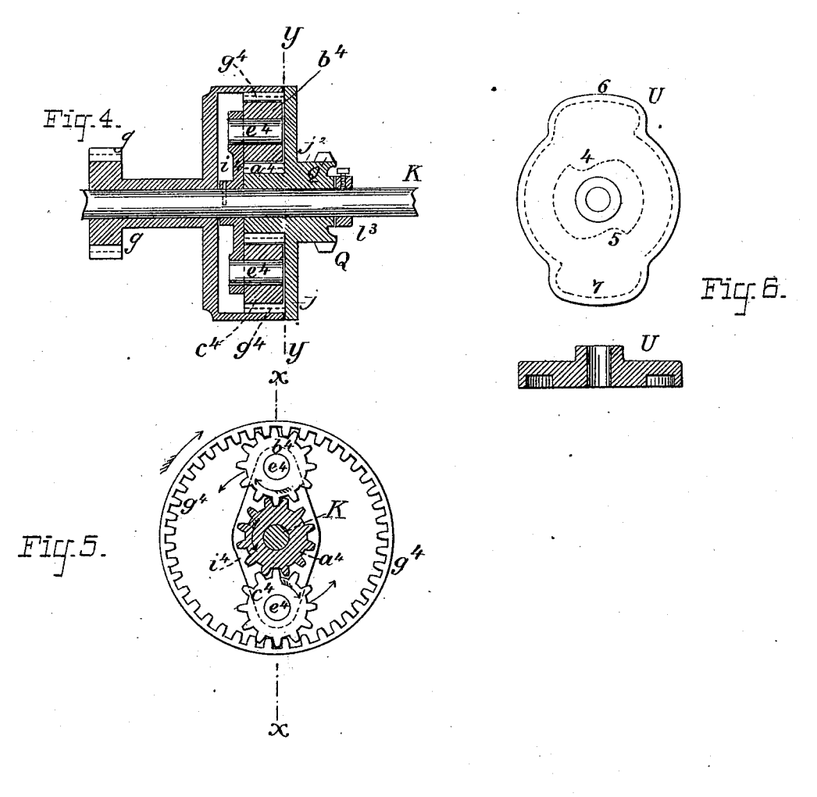
Fig. 4 is a partial vertical section at the line $x\ x$ of Fig. 5.
Fig. 5 is a cross-section at the line $y\ y$ of Fig. 4.
Fig. 6 shows in face view and in cross-section a cam-plate, to be hereinafter described.

The planetary system of gears consists of a spur-pinion, $a^4$, (see Figs. 4 and 5,) made fast to the inner face of the plate $j$, two pinions, $b^4$ $c^4$, mounted loosely on studs $e^4$, which are each made fast at one end to a cross head or bar, $i^4$, that is keyed fast on the shaft K, and an internal rim-gear, $g^4$, the hub of which is either integral with or fast to the hub of pinion $g$, that drives the large gear-wheel G. The lower ends of the packing-arms $f\ f$ are connected by pivoted rods or links $h\ h$ to the pintle $i$, which is mounted in the hub or lower end of an arm, L, which projects downward and backward from the pipe $a$, as shown.

M is the compressor-arm, or the arm against which the needle-arm forces the gavel during the operation of squeezing the latter, so that the banding-cord may be readily tied round about it, said arm being arranged and operating so that at certain times, or under certain circumstances during the binding operation, it will yield to the pressure of the gavel, and so that it will also swing clear down (out of the way) whenever a sheaf has to be discharged from the machine, all as will be hereinafter explained.

N is a drive-shaft mounted suitably in the harvester-frame, and carrying a chain-wheel, O, which, through the medium of a chain-belt, P, imparts the necessary motive power to the binder, about as usual. This belt P, as shown, engages with a chain-wheel, Q, on the packer-shaft K, said wheel Q being fast on the hub-like portion $j^2$ of the face-plate $j$. (See particularly Figs. 3 and 4.)

Figures 8, 9:
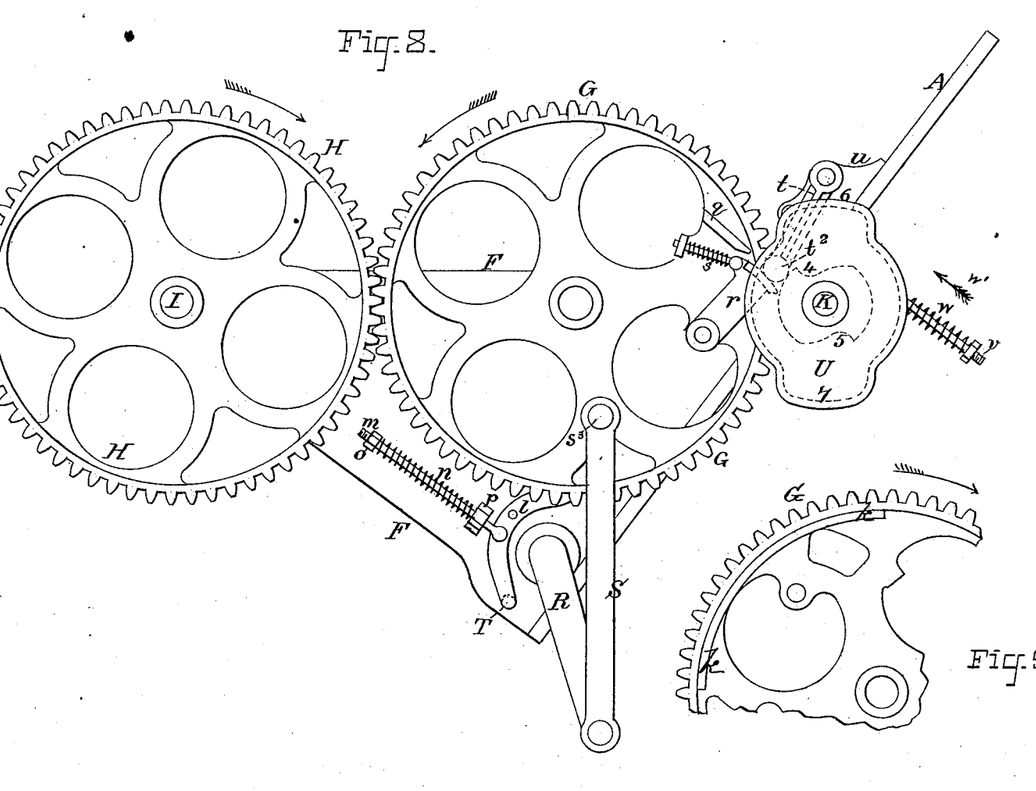
Fig. 8 is a view of the same side of the machine shown at Fig. 1, but with the moving parts in a different relative position.
Fig. 9 is a detail view of one of the gears detached, to better show a circular ledge or rib on one side thereof, that will be hereinafter more particularly described.

R is the crank of the needle-arm shaft, driven through the medium of the pitman S from the gear G. On the inner side of this gear is a circular rib, $k$, (see Fig. 9,) which periodically comes against and holds downward the upper end of the arm $l$ of rock-shaft T, for a purpose to be presently explained.

$m$ is a rod pivoted to arm $l$, and carrying a spiral spring, $n$, which serves to pull in one direction on the arm $l$, as shown, said spring being confined endwise between the nut $o$ and the stand or lug $p$, that projects from the main casting. On the outer side of gear G are a projecting cam-like device, $q$, a pivoted arm, $r$, and a spring push-bar, $s$, the functions and effects of which will be presently explained.

U is a cam-plate, which is fast on the end of the packer-shaft K, and which controls the action, to a certain extent, of the chocking-arm $t$, that is pivoted at its upper end to the stand $u$, (bolted to frame-piece A, as shown,) and that carries at its lower end an anti-friction roller that works in the groove of cam-plate U. Said arm $t$ has a projecting lug, $a^3$, on its inner side, through which passes a rod, $v$, that is pivoted at one end, as shown, to the stand $u$, and which carries on it a spiral spring, $w$, confined endwise between the said lug of arm $t$ and the nut $x$ on the threaded end of said rod $v$, the operation of these combined devices being such that the spring $w$ acts constantly with a tendency to move the lower end of arm $t$, in the direction indicated by the arrow $w'$ at Fig. 8.

Figure 1:
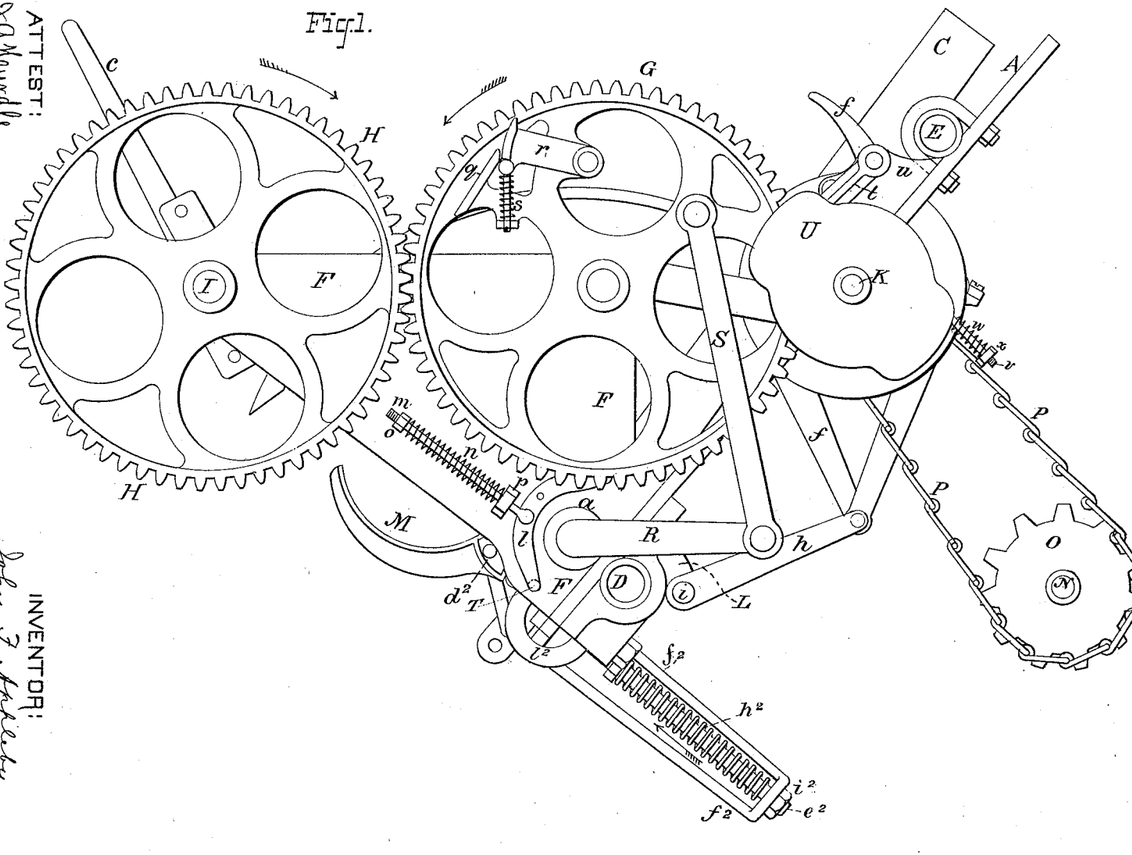
Figure 1 is a partial side view of a binder embracing my invention, and viewed from in front of the harvester, to which the binder may be attached.
Figure 2:
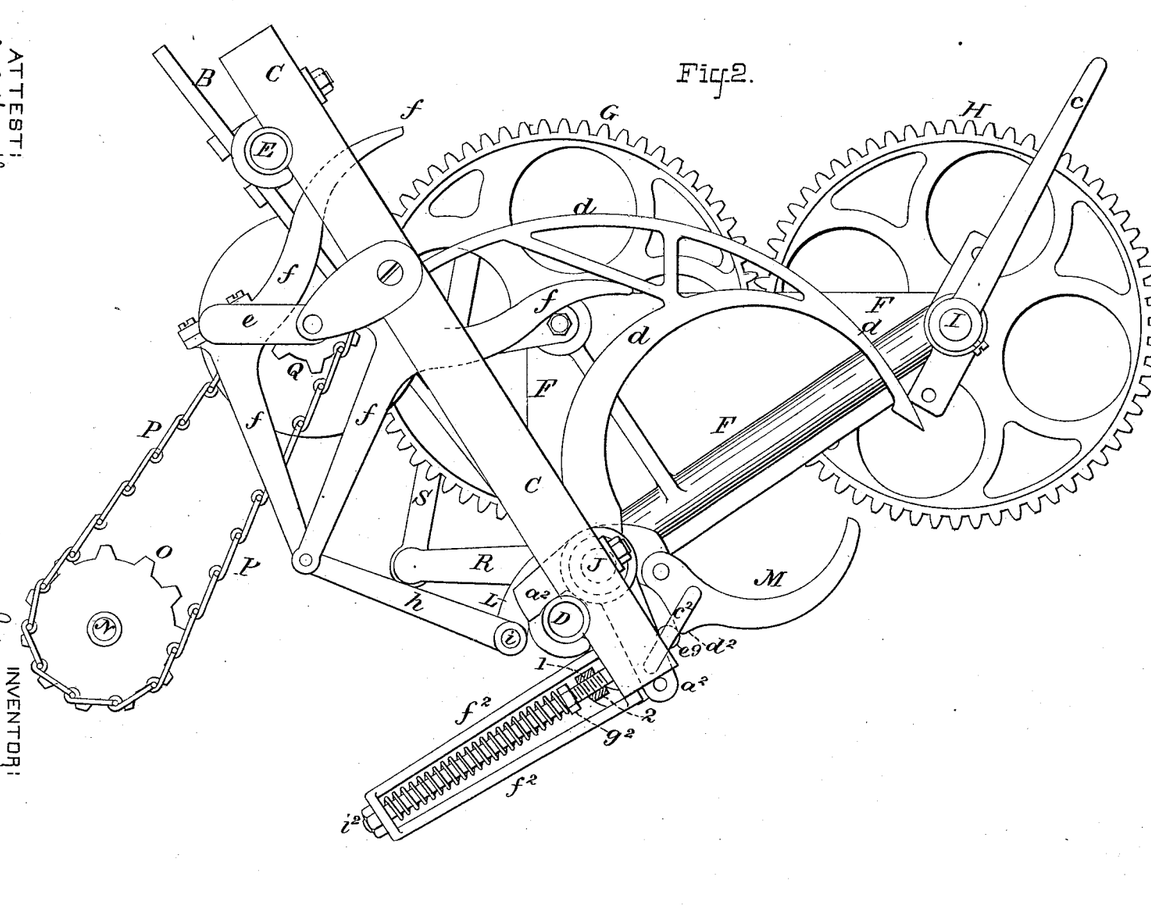
Fig. 2 is a view of the opposite side of the binder.
Figure 7:
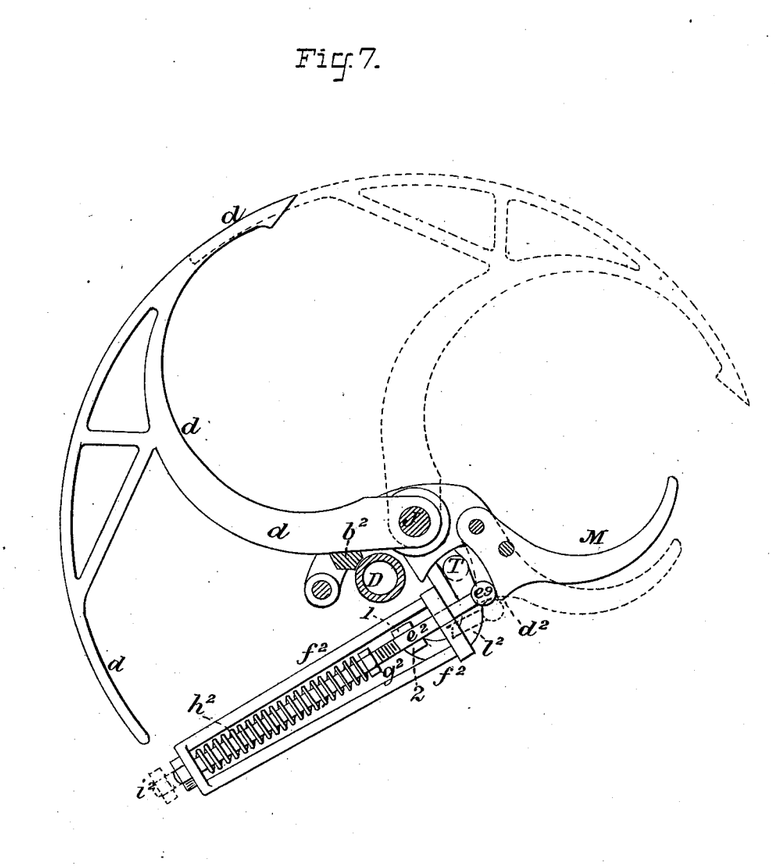
Fig. 7 is a partial sectional view, taken at $z\ z$, Fig. 3, looking in the direction indicated by the arrow at Fig. 3.

$a^2$, Figs. 2 and 3, is a sort of dog or angle-lever mounted to turn freely on the shaft J, and having at one end a laterally-projecting lug, $b^2$, Fig. 7, that underlies the back side of the needle-arm, (near its heel,) and the other end of which is connected by a short pitman or link, $c^2$, to the compressor M, as shown, which latter has a projecting portion, $d^2$, beneath that works against the upper end of the spring push-bar $e^2$. This push-bar is arranged within a cast frame, $f^2$, that projects obliquely down from the end of pipe-casting $a$. It has cut on it a screw-thread, and is provided with two nuts, between one of which, $g^2$, and the bottom of frame $f^2$ the spiral spring $h^2$ is confined endwise, the other nut, $i^2$, acting to hold the push-rod in its frame against the tendency of spring $h^2$ to move it in the direction indicated by arrow at Fig. 1. Where the projection of the compressor M bears on the push-bar $e^2$ the latter is provided, as shown, with an anti-friction roller, $e^9$.

$l^2$ is a curved arm made fast to the end of rock-shaft T, and formed with laterally-projecting spurs 1 and 2, between which lies the push-bar $e^2$, and by which the upper portion of said push-bar is raised and lowered by the rocking (in one direction and the other) of the shaft T. The casting $f^2$ is bifurcated at its upper end, and bar $e^2$ is loosely connected at the opposite end, to permit of the described motion.

With what has so far been said, together with the drawings, the following additional explanations will make clear the operations of the various parts of the machine shown and hereinbefore alluded to.

The wheel O being continuously driven by the shaft N of the harvester, the chain-belt P (passing from said wheel to the chain-wheel Q) keeps wheel Q constantly rotating, and the inclosed spur-pinion $a^4$, being fast to the hub $j^2$, must of course likewise constantly rotate, and said pinion will by its rotation effect the driving of either the packer-shaft or the binding mechanism proper, or both, according to circumstances. The spur-gear $a^4$ engages with and drives the two gears $b^4$ and $c^4$, and these gears, since they engage with the internal rim-gear, $g^4$, and have their journals $e^4$ fast in the cross-head, must operate to produce either the driving of gear $g$, or else the driving of shaft K, in the same direction of rotation as but at a less speed than the gear $a^4$ travels. Now, suppose the gear G and pinion $g$ to be chocked or prevented from turning, so that internal gear $g^4$ is held stationary, and it will be seen that as the gear $a^4$ (and the parts $j j^2$ fast therewith) are rotated by the action of belt P on wheel Q the gears $b^4$ and $c^4$ will travel around in engagement with the now stationary gear $g^4$, and that their studs $e^4$ will carry around the cross-head $i^4$, to which said studs are fast, which latter is fast on shaft K, thus rotating said shaft and effecting through the cranks $e$ of said shaft the proper movements alternately of the packers $f\ f$, which packers, it will be seen, have an extent of motion (unlike those heretofore used in the Appleby machine) sufficient to enable them to reach clear back of the needle-arm and its guard, and thus more effectually gather and carry forward and downward the grain to be packed into the gavel-receptacle.

The gears G and $g$ (and consequently the binder mechanism proper) are prevented from turning, while a gavel is being collected, in the following manner: The arm $r$ presses upward against the lower end of the chocking-arm $t$ (or, rather, against the anti-friction roller $t^2$ at the lower end of said arm) in a direction almost dead against the center of vibration of said arm $t$, and the strength of the spring $w$ is sufficient to prevent the arm $t$, pressed against in this manner by arm $r$, from moving; and hence the gear G is, so to speak, chocked. Of course this prevents the gear $g$ from turning, and the consequence is the driving of the packer-shaft, as just hereinbefore explained. The arm $r$, while it cannot possibly move in a direction that might permit it to drop out of contact at its upper end (see Fig. 8) with the roller $t^2$, is yet capable, under extraordinary strain, of moving in an opposite direction against the spring push-bar $s$, for a purpose to be presently explained. Whenever the packers, or either one of them, shall meet with that degree of resistance which is due to the collection within the gavel-receptacle of the requisite amount of grain properly compacted to form a sheath with, then the gear $g$ will become released (or unchocked) and the gear $g$ will rotate and drive, through the medium of gear G, the binder devices, because the cam-plate, fast on the end of packer-shaft, having come to a position to permit the unlocking of said gear $g$, and it now requiring less power to move the binder devices than to continue operating the packers, the mechanism for driving both of the sets of devices will naturally operate that one which will move the more easily. This unchocking of the gear G and the consequent movement of the binder devices can, however, occur at only one of two points or periods in the rotation of the packer-shaft—viz., when one or the other of the opposite depressed portions, 4 and 5, (see Figs. 6 and 8,) of cam U gets into such a relative position with the roller $t^2$ as to permit the arm $t$ to be forced back and down by the pushing or toggle-like action of the upper end of arm $r$, which then can pass (upward) by the said roller $t^2$, and the two points or times at which alone the binder devices can be started into motion are those at which one or the other of the packers has just descended to a point such that the needle-arm will start in immediately in its wake, and so catch and compress the last entered stalks of grain. The force exerted by the spring $w$ to hold the chocking-arm $t$ up to its work may be regulated by turning in one direction or the other the nut $x$, so that the unchocking alluded to will not occur until a given predetermined resistance is offered to the packing movement of the packers. The gear G, being now in motion, is driven one complete turn or revolution, and thereby the needle-arm, tyer, &c., are operated in a manner nearly the same as usual, and the gavel collected is bound into a sheaf and discharged from the machine. When the gear G gets fairly started the packers stop, because the spring chocking-arm is then thrown outward into one of the enlargements or extensions 6 7 of the cam-plate U, and the roller $t^2$ coming against the shoulder-like portion of such part 6 or 7 the cam-plate itself (which is fast on the end of packer-shaft) is now chocked, and will remain so during an entire rotation of wheel G. The cam U will remain during this rotation of the wheel G in the position shown in Fig. 1, which will carry the roller $t^2$ across the path of the cam $q$, so as to be operated thereby, as will be hereinafter explained. The size of gear G is such and the relations of the parts such that during the one revolution of said gear the needle-arm will have made one forward and one backward stroke, and these strokes are unlike, as will be presently explained, for a certain purpose. As I have just said, the packer-shaft is locked against turning by the roller $t^2$ of the chocking-arm $t$ catching against one of the shoulders of portions 6 or 7 of cam-plate U. Now, as the gear G is about completing its revolution, and just before it becomes rechocked, the cam-plate is released from the chocking action of roller $t^2$, and the packer-shaft left free to be turned, in the following manner: The inclined or cam-like ledge or lateral projection $q'$ on wheel G comes into contact with and pushes back the lower end of arm $t$, so as to unlock the cam-plate; but, having accomplished this, the roller $t^2$, which can be thus forced back only far enough to bring it into contact with the circular or concentric part of the inner wall of the groove (in U) in which it works, operates then to again chock the gear G by contact with the end of pushing-arm $r$, as before explained.

It will be observed that there will be an instant of time when both gear G and the packer-shaft might move; but it is deemed necessary to have the construction of cam U such as to permit this, because it is deemed best to allow a little time within which to effect the stoppage of one set of devices and the starting up of the other, and vice versa. Even with this provision, and with the best possible detail construction of the binder-machine, there may be a possible contingency of the two sets of devices, driven by the system of driving devices shown, getting into a dead lock, in which possible (though remote) contingency some breakage or derangement of some part would occur. To avoid any injury from any such contingency I have made the arm $r$ capable of a movement to get out of the way, (as before alluded to,) as follows: In case of any dead lock, and hence extraordinary strain between the upper end of arm $r$ and roller $t^2$, the former will be wedged or forced backward against the push-bar $s$ and get past the roller $t^2$.

Of course for the purpose of driving either the shaft K (to move the packers) or the gear G (to operate the binding devices proper) the particular construction of gears and devices shown need not be employed, as other arrangements which I have contemplated and tried (or which may be hereinafter devised) may be adopted. The essential feature of novelty, so far as the planetary gear-driving mechanism shown is concerned, being the use of some suitable means capable of imparting the power and motion derived from a continuously-moving main driver to either one or the other of the two devices to be driven according as one or the other offers more or less resistance than the other to the driver, and a supplemental feature of novelty in the contrivance shown being the use, in connection with some such means as just alluded to, of means for automatically chocking or holding still each or either of the devices to be thus driven while the other is in motion or action.

Although the shaft carrying the needle-arm is rocked by a simple crank, R, and the pitman S, connecting said crank to the wrist-pin $s^3$ (see Fig. 8) of the gear-wheel G, I have so combined and arranged the parts, it will be seen, that the slowest movement and greatest power of the needle-arm are developed during the forward stroke of the latter, (while it is compressing the gavel and binding it into a sheaf,) and the quickest movement and least expenditure of power occur during the backward stroke of the needle-arm when it has no work to do.

It will be seen that the gear G makes about two-thirds of a revolution during the binding or forward movement of the needle and only about one-third of a turn during the back stroke of the needle. By this arrangement I not only effect a very economical application of the power necessary to the binding, but I also effect a very long slow movement of the forward end of the needle-arm at the time the tying operation occurs, thus comparatively holding the gavel in a compressed condition longer by the needle-arm, and greatly relieving the tying mechanism of the difficulty of operating against that strain of the bundle on the string exerted in machines as heretofore constructed with simple crank devices to operate the needle-arm shaft. During the packing and binding of the gavel between the needle-arm and packers on one side and the opposing compressor-arm M on the other side the latter remains perfectly rigid, (while the packers are at work,) but becomes yielding or elastic in opposition to the action of the needle-arm, and after the binding of the sheaf shall have been effected said arm M is permitted to swing clear down and out of the way to permit the free discharge of the bound sheaf. These qualities of the arm M are due to this operation of the parts—viz., during the operation of the packers and while the needle-arm is at rest in its rearmost position, as shown at Fig. 7, the projection $b^2$ of the dog $a^2$ (see Fig. 2) is held down by the heel portion of the needle-arm, and thus the dog $a^2$ is made through the rigid connecting-link $c^2$ to hold up securely the pivoted arm M; but as soon as the needle-arm begins to move forward, and while in the position shown in dotted lines at Fig. 7, the arm M is relieved from this influence of the needle-arm $d$ on lug $b^2$, and the arm M is then supported or kept in the position shown by the roller $e^9$ of the push-bar $e^2$, which latter, being a yielding bar, permits the arm M to be forced downward to a limited extent, as indicated by the dotted lines at Fig. 7. The capacity of the arm M to thus yield to the action of the gavel, being compressed more or less, is regulated by adjusting the nut on rod $e^2$, that makes the spring more or less yielding. When the bundle shall have been bound and is ready to be discharged the usual sheaf-discharging arms $c\,c$ sweep it downward, the arm M being forced clear down out of the way of the sheaf as it makes its exit. This, however, could not occur were the supporting-roller $e^9$ to maintain the position seen at Fig. 7, but just prior to the depressing action caused by the outgoing sheaf, or at the same time, the upper end of push-bar $e^2$ is thrown down, so as to bring the roller $e^9$ into the position seen in dotted lines at Fig. 7. This movement of this end of bar $e^2$ is effected by the bifurcated end of arm $l^2$ of rock-shaft T, which latter is at the proper time turned (in the right direction) by the action of ledge $k$ on its arm $l$. After the discharge of the sheaf the arm M is positively returned to its original position by the action of the heel of the needle-arm on the lug $b^2$ of dog $a^2$, and thereafter the rock-shaft T, having had its arm $l$ released from the action of ledge $k$, is rocked back by the power of the spring $n$ in the pull-rod $m$. (See Fig. 8.)

Without wishing to be understood as restricting my claims of invention to any precise forms or proportions of parts, or to any particular devices not essential to the principle of construction and mode of operation of the improvements made by me, what I claim as new, and desire to secure by Letters Patent, is—

1. In combination with the packing mechanism or devices and the binder mechanism of a grain-binding machine, means for imparting the requisite power and motion to both of said mechanisms and operating to drive that one which requires the least power, substantially as set forth.

2. In combination with the binder mechanism, the packing mechanism, and means for driving both of said mechanisms, suitable means for holding in arrest the action of each of said mechanisms whenever it shall have ceased its action and the other one shall have started to work, substantially as set forth.

3. In combination with the packer driving-shaft and a device for driving the binder mechanism, a driving mechanism capable of driving either the packer-shaft or the device for actuating the binder mechanism, and always in operative connection with both, substantially as set forth.

4. In combination with the binder mechanism the packer mechanism, and a driving mechanism capable of driving either one or the other or both of the first-named two mechanisms, means for locking or holding in inaction each of the driven mechanisms, which locking or holding means is thrown into co-operation with each of said driven mechanisms by a device connected with the binder mechanism.

5. In combination with the crank of the needle-arm shaft and the gear-wheel from which said crank is operated, a pitman connecting the said wheel and crank in a manner to cause the binding movement of the needle-arm to be much slower than its return movement, as set forth.

6. In combination with the compressor-arm M, means by which said arm is rendered rigid during the compacting of the gavel by the packers and yielding during the subsequent compression of the gavel between said arm and the needle-arm, as set forth.

7. In combination with the needle-arm, a compressor or resistant, M, and means for locking the latter to the former to hold the latter rigidly against the action of the grain while being packed into the gavel-receptacle.

8. In combination with the arm M, a spring push-bar for holding said arm up against the action of the needle-arm in the compression of the gavel, as set forth.

9. In combination with the arm M and a yielding device for supporting it, means for releasing said arm from its support, substantially as and for the purpose set forth.

10. A mechanism for driving the two sets of devices that alternately operate to gavel and bind the grain, which is capable of being driven from a single drive device, and which operates to drive either one or both of the said two sets of devices, as set forth.

In witness whereof I have hereunto set my hand this 11th day of July, 1882.

JOHN F. APPLEBY.

In presence of—
J. B. BROWN,
F. R. SMYTH.